(12) United States Patent
Yoshima et al.

(10) Patent No.: US 10,396,331 B2
(45) Date of Patent: Aug. 27, 2019

(54) LAMINATE, SECONDARY BATTERY, BATTERY PACK, AND VEHICLE

(71) Applicant: KABUSHIKI KAISHA TOSHIBA, Minato-ku (JP)

(72) Inventors: Kazuomi Yoshima, Yokohama (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 260 days.

(21) Appl. No.: 15/392,436

(22) Filed: Dec. 28, 2016

(65) Prior Publication Data

US 2017/0271639 A1    Sep. 21, 2017

(30) Foreign Application Priority Data

Mar. 16, 2016 (JP) .................. 2016-052893

(51) Int. Cl.
*H01M 2/16* (2006.01)
*H01M 2/10* (2006.01)
(Continued)

(52) U.S. Cl.
CPC ....... *H01M 2/1673* (2013.01); *H01M 2/1077* (2013.01); *H01M 2/166* (2013.01);
(Continued)

(58) Field of Classification Search
CPC ............ H01M 10/052; H01M 10/056; H01M 10/0561; H01M 10/0562; H01M 10/0585;
(Continued)

(56) References Cited

U.S. PATENT DOCUMENTS

2013/0266842 A1* 10/2013 Woehrle ............... C01G 23/002
429/144
2014/0057155 A1 2/2014 Kim et al.
(Continued)

FOREIGN PATENT DOCUMENTS

EP      3 145 018 A1     3/2017
JP      2002-109955 A    4/2002
(Continued)

OTHER PUBLICATIONS

Yun-Chae Jung, et al., "All Solid-State Lithium Batteries Assembled with Hybrid Solid Electrolytes", Journal of the Electrochemical Society, vol. 162, No. 4, 2015, pp. A704-A710.
(Continued)

*Primary Examiner* — Carlos Barcena
(74) *Attorney, Agent, or Firm* — Oblon, McClelland, Maier & Neustadt, L.L.P.

(57) ABSTRACT

A laminate that includes an active material layer including a plural of active material particles, a separator layered on the active material layer, and an organic electrolyte. The separator includes a first surface and a second surface opposed to the first surface, and includes particles containing an inorganic compound having lithium ion conductivity at 25° C. of $1\times10^{-10}$ S/cm or more, and a ratio ($L/R_{max}$) of a thickness L to a radius $R_{max}$ is greater than zero and less than or equal to five, where L and $R_{max}$ are defined in the application.

15 Claims, 9 Drawing Sheets

Figure 6:
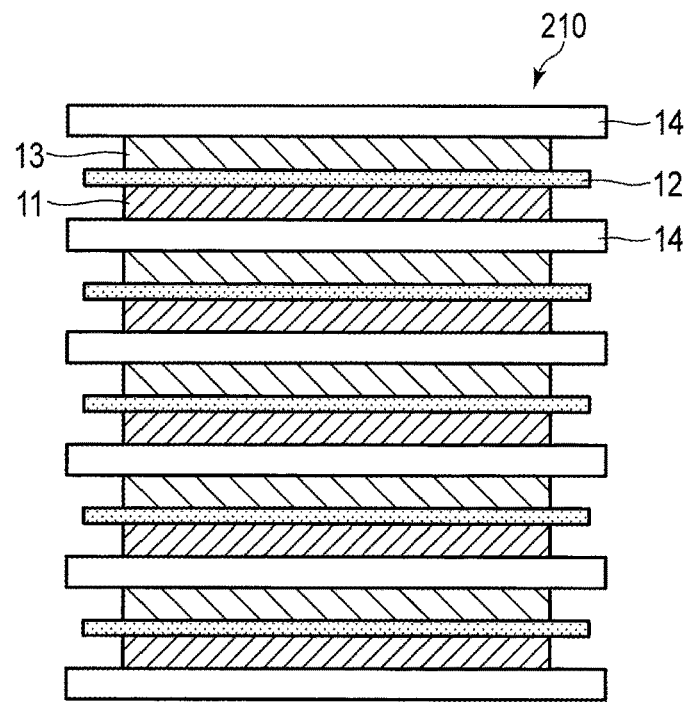

(51) Int. Cl.
*H01M 2/30* (2006.01)
*H01M 4/485* (2010.01)
*H01M 4/58* (2010.01)
*H01M 10/42* (2006.01)
*H01M 10/44* (2006.01)
*H01M 10/052* (2010.01)
*H01M 10/056* (2010.01)
*H01M 2/14* (2006.01)
*H01M 2/18* (2006.01)
*H01M 10/0585* (2010.01)

(52) U.S. Cl.
CPC ......... *H01M 2/1646* (2013.01); *H01M 2/305* (2013.01); *H01M 4/485* (2013.01); *H01M 4/5825* (2013.01); *H01M 10/052* (2013.01); *H01M 10/056* (2013.01); *H01M 10/425* (2013.01); *H01M 10/44* (2013.01); *H01M 2/145* (2013.01); *H01M 2/18* (2013.01); *H01M 10/0585* (2013.01); *H01M 2220/20* (2013.01); *H01M 2300/0071* (2013.01); *H01M 2300/0091* (2013.01); *Y02E 60/122* (2013.01); *Y02T 10/7011* (2013.01)

(58) Field of Classification Search
CPC .. H01M 10/425; H01M 10/44; H01M 10/222; H01M 10/20; H01M 2300/0071; H01M 2300/0091; H01M 2/1077; H01M 2/145; H01M 2/1646; H01M 2/166; H01M 2/1673; H01M 2/18; H01M 2/305; H01M 4/485; H01M 4/5825
See application file for complete search history.

(56) References Cited

U.S. PATENT DOCUMENTS

| | | |
|---|---|---|
| 2014/0099538 A1 | 4/2014 | Johnson et al. |
| 2014/0193691 A1 | 7/2014 | Ueki et al. |
| 2014/0302399 A1 | 10/2014 | Saimen et al. |
| 2015/0372353 A1 | 12/2015 | Ryu et al. |
| 2017/0054139 A1 | 2/2017 | Kerkamm |
| 2017/0077547 A1 | 3/2017 | Takami et al. |

FOREIGN PATENT DOCUMENTS

| | | |
|---|---|---|
| JP | 2008-210791 A | 9/2008 |
| JP | 2008-285388 A | 11/2008 |
| JP | 2008-300173 A | 12/2008 |
| JP | 2013-26031 A | 2/2013 |
| JP | 2014-35818 A1 | 2/2014 |
| JP | 2014035818 A * | 2/2014 |
| JP | 2014-203595 A | 10/2014 |
| JP | 2015-88369 A | 5/2015 |
| JP | 2015-195183 A | 11/2015 |
| JP | 2015-534243 A | 11/2015 |
| JP | 2015-534243 A5 | 11/2015 |
| KR | 10-2014-0012157 A | 1/2014 |
| KR | 10-2014-0026858 A | 3/2014 |
| KR | 10-2014-0110125 A | 9/2014 |
| WO | WO 2013-136488 A1 | 9/2013 |
| WO | WO 2014/132333 A1 | 9/2014 |
| WO | WO 2015/165701 A2 | 11/2015 |
| WO | WO 2017/046915 A1 | 3/2017 |

OTHER PUBLICATIONS

Yun-Chae Jung, et al., "Ceramic separators based on Li+ -conducting inorganic electrolyte for high-performance lithium-ion batteries with enhanced safety", Journal of Power Sources, vol. 293, 2015, pp. 675-683.

Extended European Search Report dated May 26, 2017 in Patent Application No. 17154359.8.

* cited by examiner

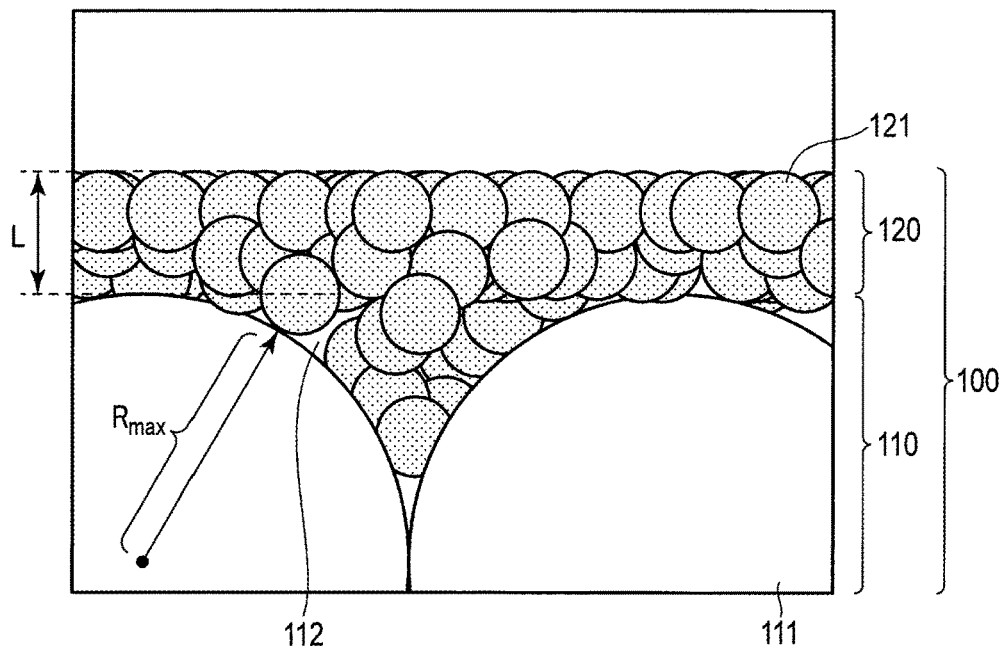
F I G. 1
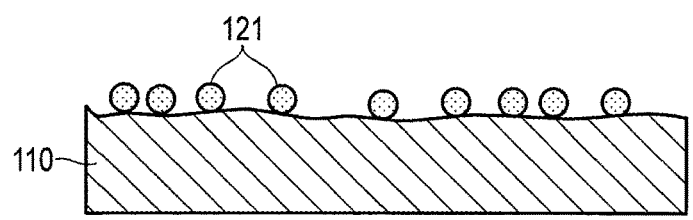
F I G. 2
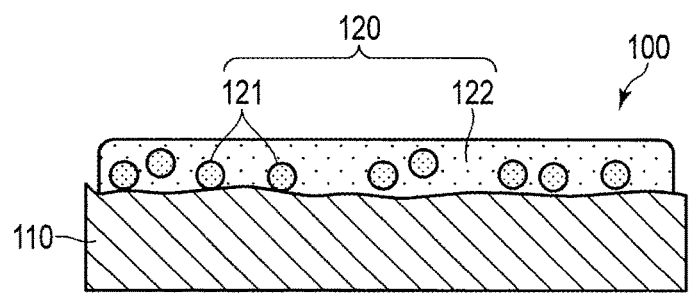
F I G. 3

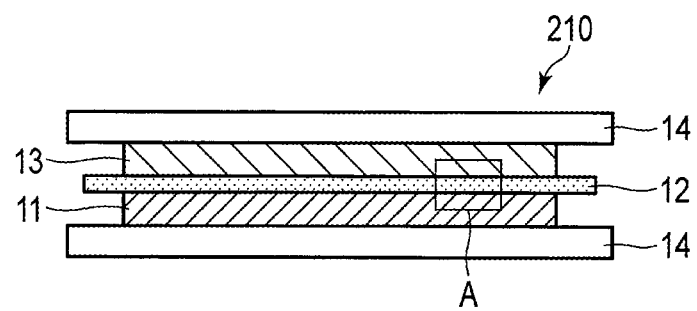
F I G. 4
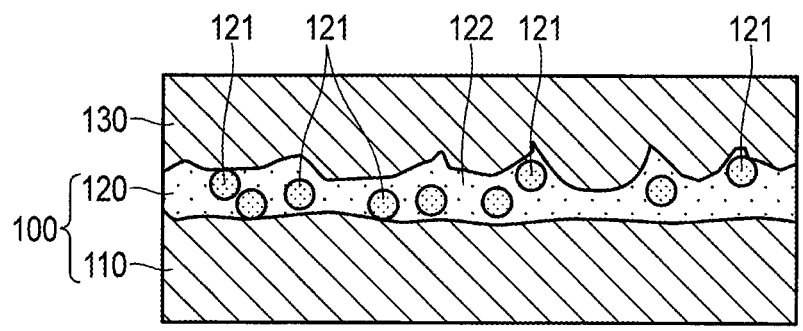
F I G. 5

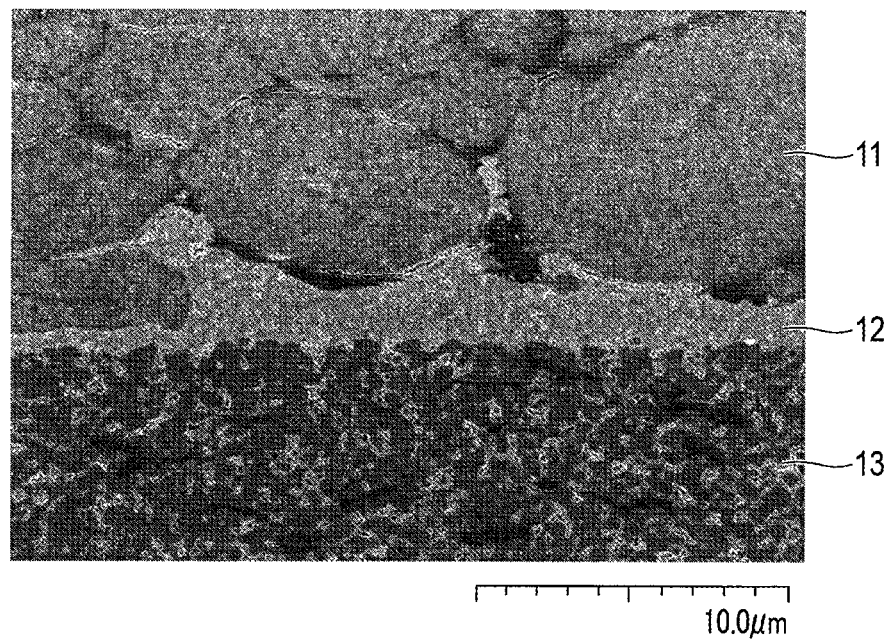
F I G. 10
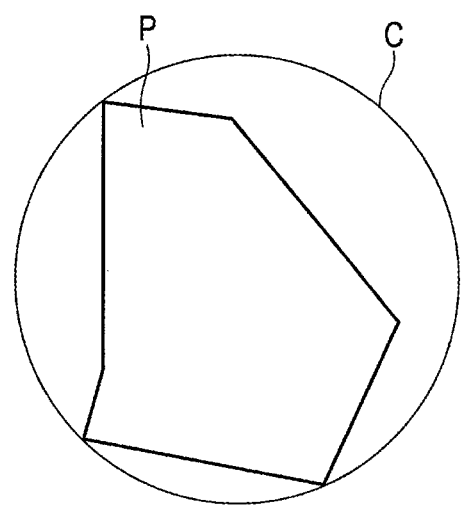
F I G. 11

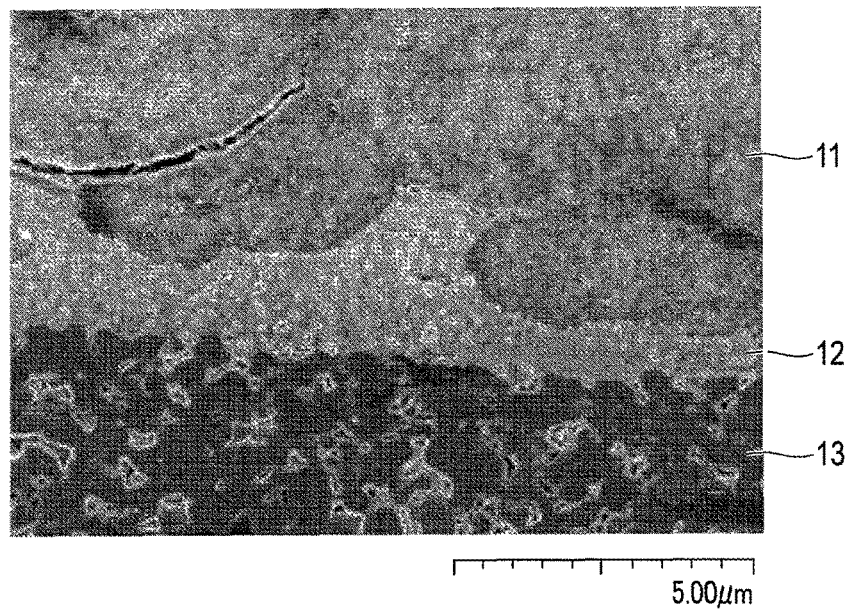
F I G. 12
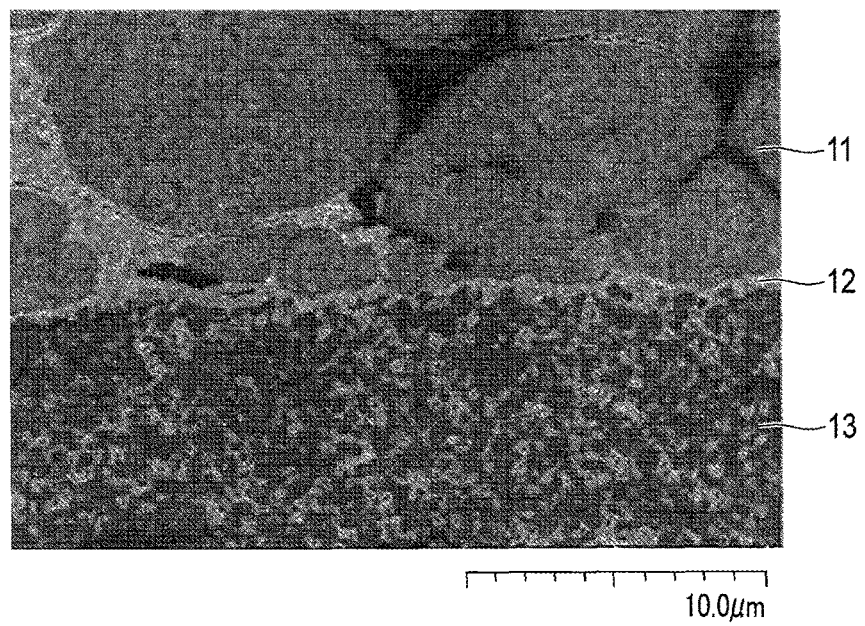
F I G. 13

LAMINATE, SECONDARY BATTERY, BATTERY PACK, AND VEHICLE

CROSS-REFERENCE TO RELATED APPLICATIONS

This application is based upon and claims the benefit of priority from Japanese Patent Application No. 2016-052893, filed Mar. 16, 2016, the entire contents of which are incorporated herein by reference.

FIELD

The embodiments of the invention relate to a laminate, a secondary battery, a battery pack, and a vehicle.

BACKGROUND

Recently, a nonaqueous electrolyte battery such a lithium ion secondary battery has been frequently researched and developed as a battery having a high energy density. The nonaqueous electrolyte battery is expected to be used as a power source for vehicles such as hybrid vehicles, electric vehicles, or an uninterruptible power supply for mobile phone base stations. The capacity of the lithium ion secondary battery is likely to increase further. Accordingly, it is important to ensure the safety of the lithium ion secondary battery.

In ordinary lithium ion secondary batteries, a polyolefin-based porous film is used as a separator that is interposed between a positive electrode and a negative electrode. For example, polyethylene having a relatively low melting point is used as a polyolefin-based material. This is because it ensures a so-called shutdown effect where the constituent resin of the separator is allowed to close the pores by melting at a temperature equal to or lower than the thermal runaway temperature of a battery, thereby increasing the internal resistance of the battery to improve the safety of the battery at the time of a short circuit.

The above separator is produced by uniaxially or biaxially orienting a film in order to improve, for example, the porosity and strength. Since a separator is provided as stated above, a certain level of strength is ensured in view of workability as an independent film. In such a uniaxially- or biaxially-oriented film, however, the degree of crystallinity is increased, and the level of the shutdown temperature is also increased close to the thermal runaway temperature of the battery. For that reason, it is hard to say that the safety of the battery is sufficient.

Further, the film subjected to drawing may shrink due to residual stress when being subjected to high temperatures.

In order to solve the problems, there is, for example, a technique for forming an integral separator layer having an excellent heat resistance on the surface of an electrode. The integral separator has various forms. The use of metal oxide particles achieves a separator having an excellent heat resistance. The integral separator does not need the same strength as that of an ordinary separator. For that reason, the thickness of the integral separator is decreased, thereby increasing the volume energy density of the battery.

Further, the separator formed of the metal oxide particles is not shrunk by heating. Thus, the separator can prevent expansion of a short circuit when an internal short circuit is generated, and prevent abnormal heat when the battery is subjected to high temperatures, thereby providing excellent safety.

However, a contact area between the particles and active material particles constituting the integral separator is large, whereby the internal resistance becomes large and a discharge performance at low temperatures is reduced.

BRIEF DESCRIPTION OF THE DRAWING(S)

Figure 7:
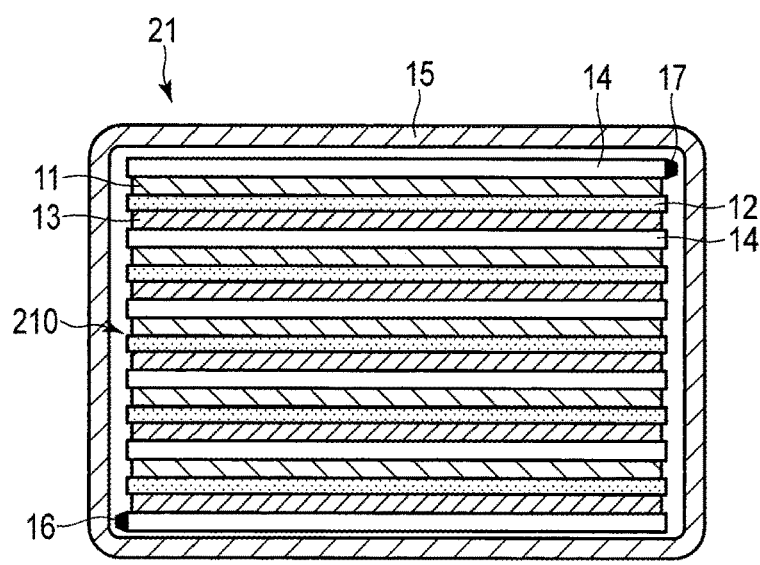
Figure 8:
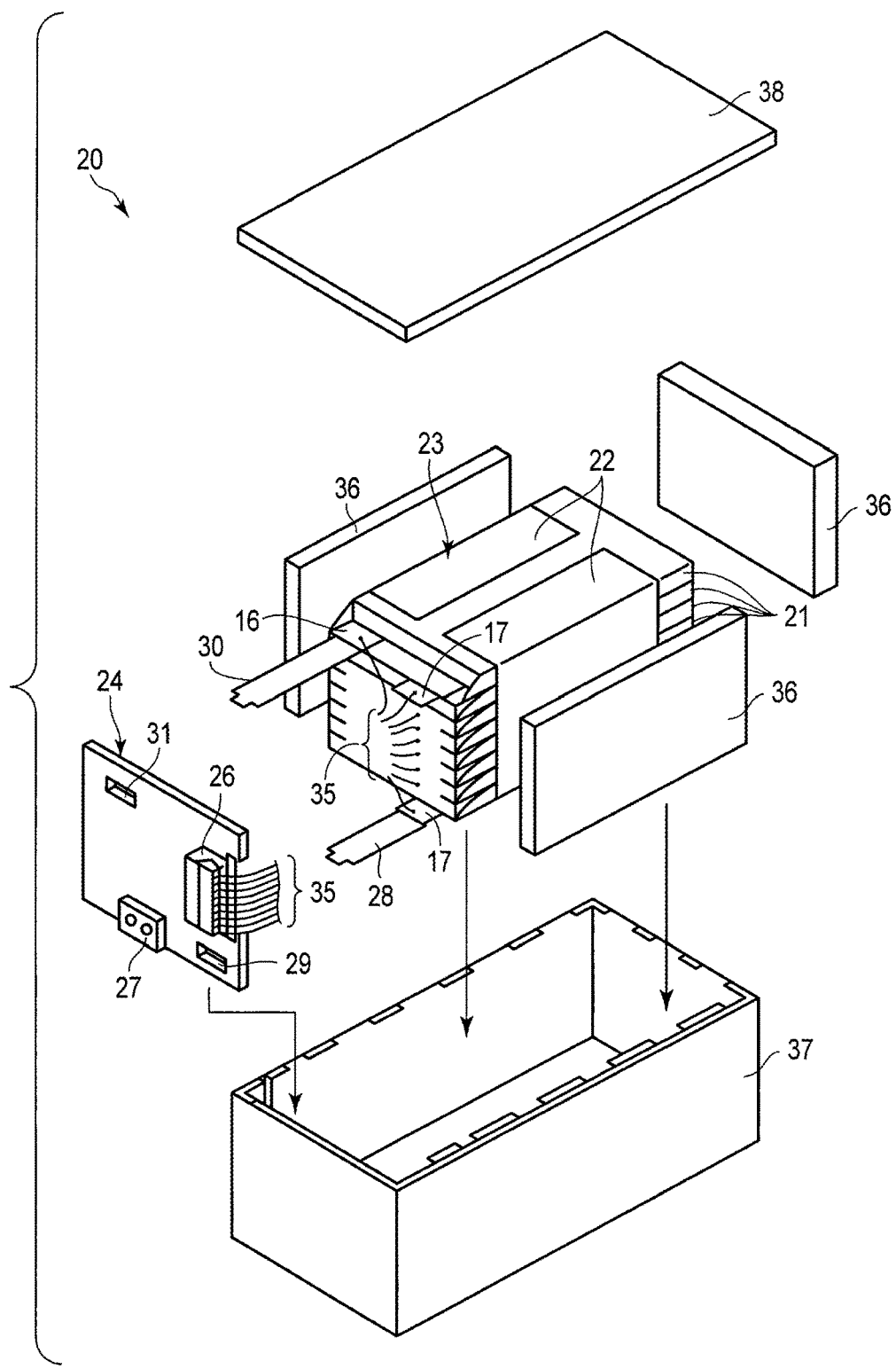
Figure 9:
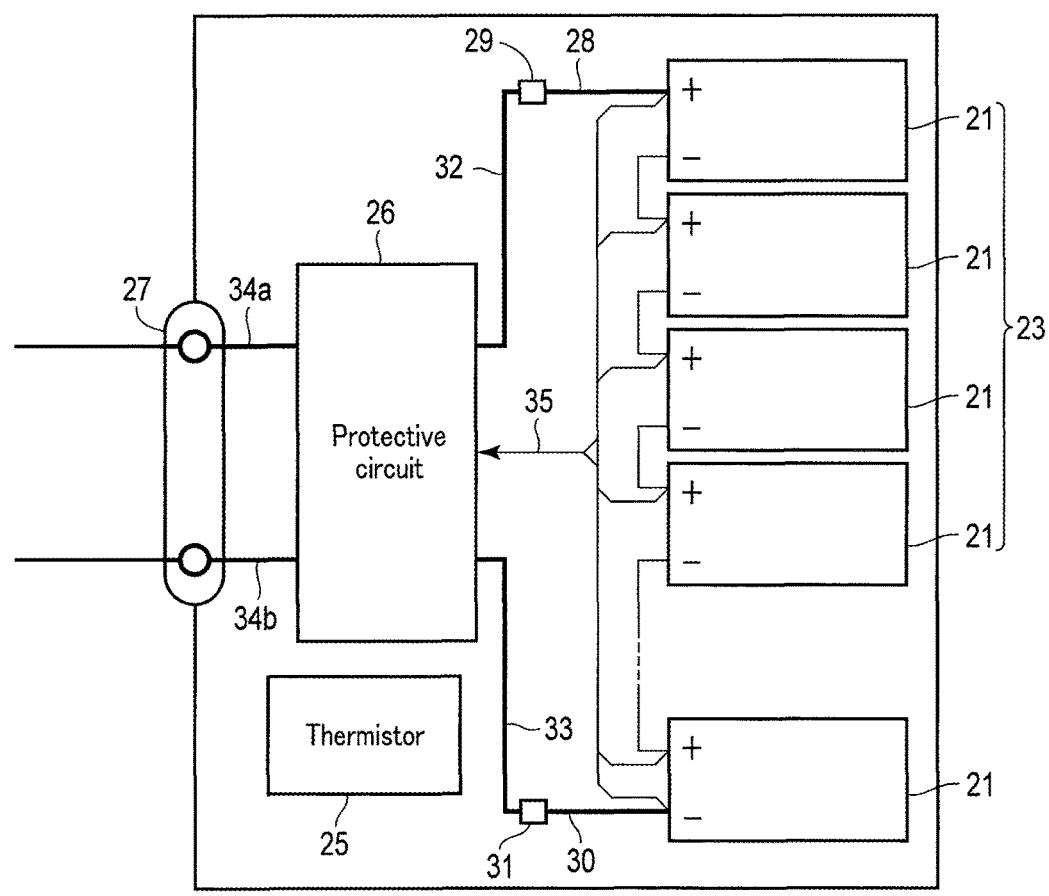
Figure 14:
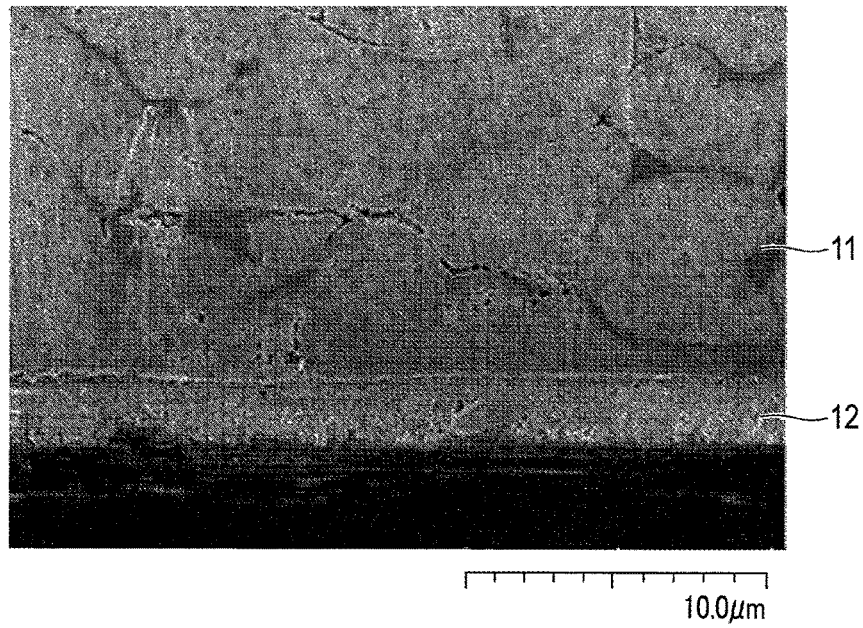
Figure 15:
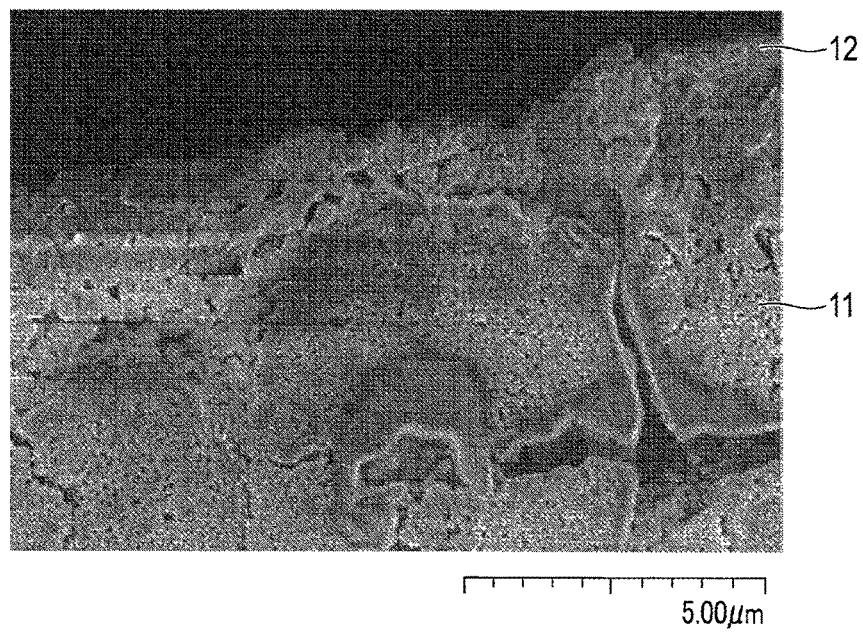
Figure 16:
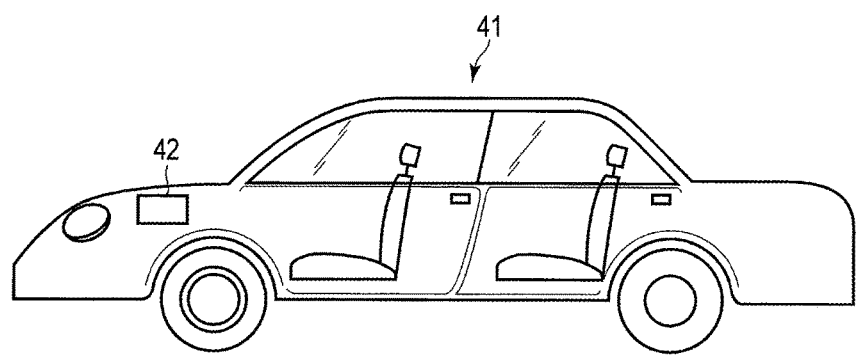

FIG. 1 is a cross-sectional view schematically showing a part of a laminate according to a first embodiment;
FIG. 2 is a pattern diagram schematically showing a step of a method of producing the laminate according to the first embodiment;
FIG. 3 is a pattern diagram schematically showing an example of the laminate according to the first embodiment;
FIG. 4 is a cross-sectional view schematically showing an example of an electrode body that is included in a secondary battery according to a second embodiment;
FIG. 5 is an enlarged cross-sectional view showing a portion A in FIG. 4;
FIG. 6 is a cross-sectional view schematically showing another example of an electrode body that is included in the secondary battery according to the second embodiment;
FIG. 7 is a cross-sectional pattern diagram schematically showing an example of the secondary battery according to the second embodiment;
FIG. 8 is an exploded perspective view showing an example of a battery pack according to a third embodiment;
FIG. 9 is a block diagram showing an electric circuit of the battery pack of FIG. 8;
FIG. 10 shows a micrograph showing a part of an electrode body according to Example 1;
FIG. 11 is a pattern diagram showing a method of measuring the particle size;
FIG. 12 shows a micrograph of another part of the electrode body according to Example 1;
FIG. 13 shows a micrograph of another part of the electrode body according to Example 1;
FIG. 14 shows a micrograph of a part of a laminate according to Example 1;
FIG. 15 shows a micrograph of another part of the laminate according to Example 1; and
FIG. 16 shows an example of a vehicle according to a fourth embodiment.

DETAILED DESCRIPTION

According to a first embodiment, a laminate is provided. The laminate includes an active material layer including a plural of active material particles and a separator layered on the active material layer. The separator includes a first surface and a second surface opposed to the first surface, and includes particles containing an inorganic compound having lithium ion conductivity at 25° C. of $1 \times 10^{-10}$ S/cm or more. A ratio ($L/R_{max}$) of a thickness L to a radius $R_{max}$ satisfies $0 < L/R_{max} \leq 5$, where the radius $R_{max}$ is a radius of the active material particle having a maximum particle size among the active material particles facing the first surface of the separator, and the thickness L is distance from an interface between the active material particle having a maximum particle size and the first surface of the separator to the second surface of the separator.

According to a second embodiment, a secondary battery is provided. The secondary battery includes the laminate according to the first embodiment.

According to a third embodiment, a battery pack is provided. The battery pack includes the secondary battery according to the second embodiment.

According to a fourth embodiment, a vehicle is provided. The vehicle includes the battery pack according to the third embodiment.

Embodiments are explained below referring to drawings. In the following descriptions, the same reference number is applied to structural features having the same or similar function throughout all drawings, and overlapped explanations are omitted. Each drawing is a schematic view for explaining the embodiment and promoting the understanding thereof. Shapes, sizes and ratios in the drawing, accordingly, may be different from those in a practical apparatus, but they may be appropriately designed and changed considering the following descriptions and known technology.

(First Embodiment)

According to a first embodiment, a laminate is provided. The laminate includes an active material layer including a plural of active material particles and a separator layered on the active material layer. The separator includes a first surface and a second surface opposed to the first surface, and includes particles containing an inorganic compound having lithium ion conductivity at 25° C. of $1 \times 10^{-10}$ S/cm or more. A ratio ($L/R_{max}$) of a thickness L to a radius $R_{max}$ satisfies $0 < L/R_{max} \leq 5$, where the radius $R_{max}$ is a radius of the active material particle having a maximum particle size among the active material particles facing the first surface of the separator, and the thickness L is distance from an interface between the active material particle having a maximum particle size and the first surface of the separator to the second surface of the separator.

The laminate includes, for example, a structural body in which a separator is layered on an active material layer of an electrode including the active material. When the thickness of the separator is adequately small, in the battery having the laminate, the volume ratio of the electrode per unit volume increases, thereby increasing the volume energy density of the battery. As described below, the separator contains particles which include an inorganic compound having excellent lithium ion conductivity. Thus, a battery including the laminate realize a low internal resistance and an excellent discharge performance at low temperatures.

FIG. 1 is a cross-sectional view schematically showing a part of a laminate. A laminate 100 in FIG. 1 includes an active material layer 110 and a separator 120.

The active material layer 110 includes, for example, a plural of active material particles 111. The active material layer 110 may include an additive such as a conductive agent and/or a binder, and may further include another additive. The average particle size of the active material particles 111 is, for example, within a range of 0.05 μm to 30 μm and preferably within a range of 0.1 μm to 10 μm. The average particle size of the active material particles 111 can be measured in the same manner as in the measurement of the average particle size of the particles to be described below.

The thickness of the active material layer 110 is not particularly limited, and is, for example, within a range of 10 μm to 200 μm, and preferably within a range of 30 μm to 100 μm.

The separator 120 includes particles 121. The separator 120 may further include an organic electrolyte 122 (not shown in FIG. 1). The separator 120 may be configured to include the particles 121 and the organic electrolyte 122. The separator 120 may further include an additive such as a binder.

In FIG. 1, L denotes the thickness of the separator 120. The thickness L of the separator 120 can be determined in the following manner. First, the radius $R_{max}$ of the active material particle 111 having a maximum particle size, among the active material particles 111 in contact with the main surface of the separator 120, is examined. The $R_{max}$ can be measured together with the thickness L of the separator, as described below.

Here, a ratio of the $R_{max}$ to the thickness of the active material layer 110 is, for example, within a range of $2.5 \times 10^{-4}$ to 3, and preferably within a range of 0.001 to 0.33. When the ratio of the $R_{max}$ to the thickness of the active material layer 110 is within the above range, too large active material particles 111 are not present in the active material layer 110, thereby reducing the internal resistance.

Next, a distance from the interface between the active material particle 111 having the $R_{max}$ and the main surface as the first surface of the separator 120 to the other surface as the second surface of the separator 120 is measured. The second surface is opposed to the first surface. The distance is defined as the thickness L of the separator. The radius $R_{max}$ of the active material particle 111 having a maximum particle size and the thickness L of the separator are measured by the following method.

In the case where the electrode body is taken out and measured, when the taken-out electrode body has a square or polygonal shape, the electrode body is cut along a diagonal line using a focused ion beam (FIB). When the taken-out electrode body has a circular or almost circular shape (including an oval shape), the electrode body is cut along the diameter of the circle using FIB. The whole cut surface is measured with a scanning electron microscope (SEM). The measurement point of the cut surface is located at a length of 5 mm from the center of the diagonal line (or the central part of the diameter of the circle), and the observation magnification is 5000 times. The $R_{max}$ is determined by the observation and then the thickness L of the separator is measured.

The ratio $L/R_{max}$ satisfies $0 < L/R_{max} \leq 5$. When the ratio $L/R_{max}$ is within this range, the thickness of the separator 120 is adequately small relative to the thickness of the active material layer 110. Accordingly a battery including the laminate 100 achieves a high capacity. The ratio $L/R_{max}$ may be 3 or less, 2 or less, or 1 or less. The ratio $L/R_{max}$ is preferably 0.8 or less, more preferably 0.5 or less, and still more preferably 0.1 or less. The ratio $L/R_{max}$ is preferably $1 \times 10^{-5}$ or more.

The active material layer 110 includes a gap 112 which is formed by accumulation of the active material particles 111. It is preferable that the particles 121 forming the separator 120 have entered the gap 112 as shown in FIG. 1. The particles 121 have entered the gap 112, whereby the internal resistance can be reduced. The volume of the particles 121 is preferably high relative to the volume of the gap 112. The volume of the particles 121 relative to the volume of the gap 112 is, for example, 80% by volume or more.

The average particle size of the particles 121 is, for example, 1 μm or less. When the average particle size of the particles 121 is within this range, the particles easily enter the gap 112, thereby reducing the internal resistance. The average particle size of the particles 121 is preferably within a range of 0.01 μm to 0.5 μm and more preferably within a range of 0.05 μm to 0.3 μm.

Here, a method of measuring the average particle size of particles is described.

In the case where the particles can be isolated, the average particle size is determined by laser diffractometry.

On the other hand, in the case where the particles are included in an electrolyte of a battery, the average particle size can be measured by distinguishing active material particles from the particles using SEM and energy dispersive X-ray spectroscopy during observation. First, the electrode body is cut along the diagonal line using FIB so that a positive electrode, a separator, and a negative electrode are cut. In this case, it is preferable that the electrode body is cut without breaking the organized structure. Next, the whole cut surface is observed using SEM. At this time, the particles are randomly observed, and an average of sizes of at least 100 particles is defined as the average particle size.

The particle size of each of the particles can be determined in the following manner. FIG. 10 is a micrograph showing a part of the electrode body according to Example 1 as described below. This photograph is an SEM image obtained by SEM observation of a cross section of the electrode body which is cut along a diagonal line so as to cut the positive electrode, the separator, and the negative electrode. When observing the SEM image shown in FIG. 10, as a circle surrounding a particle P (i.e., a circumscribed circle), a circle C with the smallest diameter (referred to as "the smallest circumscribed circle") is drawn as illustrated in the pattern diagram shown in FIG. 11. The diameter of the smallest circumscribed circle is defined as the particle size.

The average particle size of the particles 121 is preferably smaller than the average particle size of the active material particles 111. As a result, the particles 121 easily enter the gap 112, thereby reducing the internal resistance.

The particles 121 contain an inorganic compound having lithium ion conductivity at 25° C. of $1 \times 10^{-10}$ S/cm or more. The particles 121 may contain an inorganic compound having lithium ion conductivity at 25° C. of less than $1 \times 10^{-10}$ S/cm. The particles 121 may be made of an inorganic compound having lithium ion conductivity at 25° C. of $1 \times 10^{-10}$ S/cm or more. In the present specification, the inorganic compound having lithium ion conductivity at 25° C. of $1 \times 10^{-10}$ S/cm or more is hereinafter referred to as a "first inorganic compound". On the other hand, the inorganic compound having lithium ion conductivity at 25° C. of less than $1 \times 10^{-10}$ S/cm is referred to as a "second inorganic compound".

In the case where the particles 121 contain the first inorganic compound, when an electric field is applied from the outside, lithium ions freely move inside the first inorganic compound. For that reason, when the particles 121 which contain the first inorganic compound are disposed between positive and negative electrodes, polarization occurs at the interface between the particles 121 and the organic electrolyte 122 due to a potential difference between the positive and negative electrodes. The polarization results in accumulation of lithium ions on the surface of the particles 121, thereby forming a portion having a high concentration of lithium ions. As a result, the lithium ion insertion/extraction rate is improved and the discharge performance at low temperatures is further improved.

The first inorganic compound is, for example, at least one selected from the group consisting of sulfide-based $Li_2SeP_2S_5$ glass ceramics, an inorganic compound having a perovskite structure, an inorganic compound having a LiSICON type structure, and an inorganic compound having a garnet structure.

Among these compounds, the inorganic compound having a garnet structure is preferred as the first inorganic compound. The inorganic compound having a garnet structure has high lithium ion conductivity, a high reduction resistant property, and a wide electrochemical window, which is thus preferred. Examples of the inorganic compound having a garnet structure include $Li_{5+x}A_yLa_{3-y}M_2O_{12}$ (A is at least one selected from the group consisting of Ca, Sr, and Ba, and M is at least one selected from the group consisting of Nb and Ta), $Li_3M_{2-x}Zr_2O_{12}$ (M is at least one selected from the group consisting of Ta and Nb), $Li_{7-3x}Al_xLa_3Zr_2O_{12}$, and $Li_7La_3Zr_2O_{12}$. In the above examples, x is, for example, from 0 to 0.8, and preferably from 0 to 0.5. y is, for example, from 0 to 2. The inorganic compound having a garnet structure may be made of one of the compounds, or may be contain a mixture of two or more kinds of the compounds. Among the compounds, $Li_{6.25}Al_{0.25}La_3Zr_2O_{12}$ and $Li_7La_3Zr_2O_{12}$ have high ion conductivity and are electrochemically stable. Thus, these compounds are excellent in discharge performance and cycle life performance. Further, it is advantageous that the compounds even after microparticulation are chemically stable relative to the organic electrolyte 122 to be described below.

The particles 121 may further contain the second inorganic compound. In the case where the particles contain the second inorganic compound, the proportion of the mass of the first inorganic compound to the total mass of the particles 121 is, for example, 70% by mass or more, and preferably 90% by mass or more. In the case of the second inorganic compound, lithium ions hardly move during polarization. Therefore, the particles containing the second inorganic compound may have a high electrochemical stability and, particularly excellent high-temperature stability. Accordingly, when the particles contain the second inorganic compound, cycle life characteristics of the battery may be improved.

The second inorganic compound is not particularly limited, and is preferably at least one selected from the group consisting of aluminium oxide, zirconium oxide, silicon oxide, and magnesium oxide from the viewpoint of low cost and high reduction property. Further, in the case where the second inorganic compound is a metal oxide such as titanium oxide, niobium oxide, tantalum oxide, hafnium oxide, yttrium oxide, gallium oxide or germanium oxide, or a lanthanoid oxide such as lanthanum trioxide, the same effects can be obtained. The second inorganic compound may be one or two or more selected from the above compounds.

The organic electrolyte 122 contains, for example, at least one selected from propylene carbonate, ethylene carbonate, diethyl carbonate, and methylethyl carbonate, each of them has ion conductivity. The use of the organic electrolyte 122 is advantageous because the above inorganic compounds hardly melt and stably exist. In this regard, the use of sulfide solid electrolyte particles having high lithium ion conductivity as the organic electrolyte 122 is not preferred because a sulfur component dissolves.

The organic electrolyte 122 preferably contains a lithium salt such as lithium perchlorate ($LiClO_4$), lithium hexafluorophosphate ($LiPF_6$), lithium tetrafluoroborate ($LiBF_4$), lithium hexafluoro arsenate ($LiAsF_6$), and lithium trifluoromethanesulfonate ($LiCF_3SO_3$) or bistrifluoromethylsulfonylimidolithium [$LiN(CF_3SO_2)_2$], or a mixture thereof. The organic electrolyte 122 may contain a different electrolyte.

The ratio of the amount of the organic electrolyte 122 to the amount of the separator 120 is, for example, within a range of 0.1% by mass to 20% by mass, and preferably within a range of 1% by mass to 10% by mass. For example, the ratio of the amount of the organic electrolyte to the total amount of the particles and the organic electrolyte is within a range of 1% by mass to 10% by mass. When the ratio of the amount of the organic electrolyte 122 to the amount of the separator 120 is within this range, a lithium ion conductive path in which lithium ion conduction easily occurs is formed on the surface of the inorganic compound and a favorable interface between the solid electrolyte and the active material is formed. Thus, the high temperature durability and cycle life of the battery are improved.

Preferable examples of the binder which is included in the separator 120 include polymers gelatinized with carbonates such as polyacrylonitrile (PAN), polyethylene oxide (PEO), polyvinylidene fluoride (PVdF), and polymethylmethacrylate. The binders may be used singly or in mixture of two or more kinds thereof. For example, when the binder is PVdF, the content thereof is preferably less than 20% by mass relative to the mass of the separator 120.

The separator 120 is preferably a solid separator or a gel separator. The composition of the organic electrolyte 122 and the composition of the binder are appropriately changed so that the separator 120 is modified into a solid form or a gel form. In the case where the separator 120 has a solid form, it is possible to realize a compact battery. On the other hand, in the case where the separator 120 has a gel form, the production of the battery is facilitated and the operation of modifying the form of the battery is simplified.

Subsequently, the method of producing the laminate according to the present embodiment will be described with reference to FIGS. 2 and 3. FIG. 2 is a pattern diagram schematically showing a step of the method of producing the laminate according to the present embodiment. FIG. 3 is a pattern diagram schematically showing an example of the produced laminate.

First, active material particles, a conductive agent, and a binder are provided. Next, these materials are suspended in an appropriate solvent. This suspension is applied to one side or both sides of a current collector such as an aluminum foil, followed by drying. The suspension is dried, and then the current collector is pressed to form an electrode. Thus, an electrode in which the active material layer 110 is formed on the current collector is obtained.

Subsequently, as shown in FIG. 2, the particles 121 are layered by applying a dispersion which contains the particles 121 and optionally contains a binder to the active material layer 110 and dried. The dispersion coating method is not particularly limited. Methods considered include, for example, a coating method using an applicator roll, a spray method, a spin coating method, and a mist deposition method. Among them, the spray method is preferably used. In the case of the spray method, the dispersion can be sprayed at a relatively high pressure on the active material layer 110. Thus, the particles 121 easily enter the gap 112, thereby reducing the internal resistance.

After that, as shown in FIG. 3, the layered particles 121 are impregnated with the organic electrolyte 122 and subjected to a heat treatment (90° C. to 130° C.), whereby the laminate 100 in which the separator 120 is formed on the active material layer 110 is obtained. It is preferable to perform the heat treatment at 120° C.

According to the first embodiment, a laminate is provided. The laminate includes an active material layer including a plural of active material particles and a separator layered on the active material layer. The separator includes a first surface and a second surface opposed to the first surface, and includes particles containing an inorganic compound having lithium ion conductivity at 25° C. of $1 \times 10^{-10}$ S/cm or more. A ratio ($L/R_{max}$) of a thickness L to a radius $R_{max}$ satisfies $0 < L/R_{max} \leq 5$, where the radius $R_{max}$ is a radius of the active material particle having a maximum particle size among the active material particles facing the first surface of the separator, and the thickness L is distance from an interface between the active material particle having a maximum particle size and the first surface of the separator to the second surface of the separator.

According to the laminate, the thickness of the separator is adequately small and the particles contain an inorganic compound having excellent lithium ion conductivity. Thus, it is possible to realize a secondary battery with a high capacity, a low internal resistance, and an excellent discharge performance at low temperatures.

(Second Embodiment)

According to a second embodiment, a secondary battery is provided. The secondary battery includes the laminate according to the first embodiment. As described in the first embodiment, the laminate includes an active material layer and a separator. The active material layer may be, for example, a part of the positive or negative electrode of the secondary battery. In other words, the secondary battery includes, for example, a positive electrode, a negative electrode, and a separator, and the active material layer included in the positive electrode and/or the negative electrode is layered on the separator to form a laminate. The secondary battery may further include a container member, a positive electrode terminal, and a negative electrode terminal.

FIG. 4 is a cross-sectional view schematically showing an example of an electrode body that is included in the secondary battery according to the embodiment. An electrode body 210 in FIG. 4 is configured such that a structure formed by stacking the positive electrode 11, the separator 12, and the negative electrode 13 in this order is sandwiched by current collectors 14.

(Positive Electrode)

The positive electrode 11 shown in FIG. 4 is formed on one side of the current collector 14. The positive electrode 11 includes a positive active material layer which contains, for example, an active material, a conductive agent, and a binder. As the positive electrode 11 facing the current collector 14, an aluminum foil is used. It is preferable to use a pure aluminum foil (purity: 100%) and an aluminum alloy foil (purity: 99% or more). The aluminium alloy is preferably an alloy containing at least one element selected from the group consisting of iron, magnesium, zinc, manganese, and silicon, in addition to aluminum. For example, Al—Fe, Al—Mn, and Al—Mg alloys can achieve a higher strength than aluminum. On the other hand, the content of a transition metal such as nickel or chromium in the aluminum and aluminium alloy is preferably 100 ppm or less (including 0 ppm). For example, the use of the Al—Cu alloy increases the strength, but decreases corrosion resistance. Therefore, the Al—Cu alloy is not suitable for the current collector 14.

More preferably, the aluminum foil as the current collector 14 facing the positive electrode 11 has a purity of 99%.0 to 99.99%. When the purity is within this range, deterioration in the high temperature cycle life caused by dissolution of impurity elements is reduced.

As for positive electrode active material particles forming the positive electrode active material, the average particle size of primary particles is, for example, within a range of 0.01 μm to 10 μm, and preferably within a range of 0.05 μm to 5 μm. The positive electrode active material particles may include a secondary particle which is an aggregate of primary particles. The average particle size of the secondary particle in the positive electrode active material particles is, for example, within a range of 0.1 μm to 10 μm, and preferably within a range of 1 μm to 5 μm.

Examples of the positive electrode active material to be used include at least one selected from the group consisting of lithium manganese composite oxide, lithium nickel composite oxide, lithium cobalt aluminum composite oxide, lithium nickel cobalt manganese composite oxide, spinel type lithium manganese nickel composite oxide, lithium manganese cobalt composite oxide, lithium iron phosphate having an olivine structure (LiFePO$_4$ etc.), and lithium manganese phosphate (LiMnPO$_4$).

Specific examples thereof include lithium manganese composite oxide (e.g., Li$_x$Mn$_2$O$_4$ or Li$_x$MnO$_2$), lithium nickel aluminum composite oxide (e.g., Li$_x$Ni$_{1-y}$Al$_y$O$_2$), lithium cobalt composite oxide (e.g., Li$_x$CoO$_2$), lithium nickel cobalt manganese composite oxide (e.g., Li$_x$Ni$_{1-y-z}$Co$_y$Mn$_z$O$_2$), lithium manganese cobalt composite oxide (e.g., Li$_x$Mn$_y$Co$_{1-y}$O$_2$), spinel type lithium manganese nickel composite oxide (e.g., Li$_x$Mn$_{2-y}$Ni$_y$O$_4$), lithium phosphorus oxide having an olivine structure (e.g., Li$_x$FePO$_4$, Li$_x$Fe$_{1-y}$Mn$_y$PO$_4$, Li$_x$CoPO$_4$ or LiMn$_{1-x-y}$Fe$_x$A$_y$PO$_4$, 0<x≤0.3, 0≤y≤0.1, wherein A is at least one selected from the group consisting of Mg, Ca, Al, Ti, Zn, and Zr), and fluorinated iron sulfate (e.g., Li$_x$FeSO$_4$F). x and y preferably satisfy 0<x≤1 and 0<y≤1, respectively. z preferably satisfies 0<z≤0.5. The use of these compounds achieves a high voltage of the positive electrode.

Among the above, lithium nickel aluminum composite oxide, lithium nickel cobalt manganese composite oxide, or lithium manganese cobalt composite oxide can inhibit the reaction with the nonaqueous electrolyte in a high-temperature environment, whereby the battery life is significantly improved. Particularly, the lithium nickel cobalt manganese composite oxide represented by Li$_x$Ni$_{1-y-z}$Co$_y$Mn$_z$O$_2$ (0≤x≤1.1, 0≤y≤0.5, 0≤z≤0.5) is preferred. The use of the lithium nickel cobalt manganese composite oxide makes it possible to improve high-temperature durability.

The conductive agent is added, for example, in order to improve the electron conductivity of the positive electrode 11 and suppress the contact resistance with the current collector 14. Examples of the conductive agent include acetylene black, carbon black, and graphite. As the conductive agent, these carbonaceous substances may be used singly or in combination of a plural of them.

The binder functions to bond the active material and the conductive agent to be adhered to the current collector. As the binder, for example, at least one selected from the group consisting of polytetrafluoroethylene (PTFE), polyvinylidene fluoride (PVdF), a cellulose-based material (e.g., sodium carboxymethyl cellulose (CMC)), fluorine-based rubber, styrene butadiene rubber, an acrylic resin or its copolymer, polyacrylic acid, and polyacrylonitrile may be used, but is not limited thereto.

As proportions of the positive electrode active material, the conductive agent, and the binder, the positive electrode active material is preferably within a range of 80% by mass to 95% by mass, the conductive agent is preferably within a range of 3% by mass to 18% by mass, and the binder is preferably within a range of 2% by mass to 7% by mass. It is possible to attain the above effect by keeping the amount of the conductive agent to 3% by mass or more. It is possible to reduce the decomposition of the nonaqueous electrolyte on the surface of the conductive agent during storage at high temperatures by keeping the amount of the conductive agent to 18% by mass or less. It is possible to attain sufficient electrode strength by keeping the amount of the binder to 2% by mass or more. It is possible to reduce the amount of the binder which is an insulating material in the positive electrode, and to reduce internal resistance by keeping the amount of the binder to 7% by mass or less.

The positive electrode is made, for example, in the following manner. First, the positive electrode active material, the conductive agent, and the binder are provided. Next, these materials are suspended in an appropriate solvent. This suspension is applied to one side or both sides of a current collector such as an aluminum foil, followed by drying. The suspension is dried, and then the current collector is pressed to form a positive electrode. The pressure to press the positive electrode is preferably within a range of 0.15 ton/mm to 0.3 ton/mm. This range is preferred because the adhesion (peel strength) between the positive active material layer and the current collector increases, and the extension coefficient of the collector foil becomes 20% or less. Thus, the positive electrode including the positive active material layer is made.

(Negative Electrode)

In the electrode body 210 in FIG. 4, the negative electrode 13 is supported on one side of the current collector 14. The negative electrode 13 includes, for example, a negative electrode active material layer which contains an active material, a conductive agent, and a binder.

As the negative electrode 13 facing the current collector 14, an aluminum foil is used. It is preferable to use a pure aluminum foil (purity: 100%) and an aluminum alloy foil (purity: 98% or more). The aluminium alloy is preferably an alloy containing at least one element selected from the group consisting of iron, magnesium, zinc, manganese, and silicon, in addition to aluminum. For example, Al—Fe, Al—Mn, and Al—Mg alloys can achieve a higher strength than aluminum. On the other hand, the content of a transition metal such as nickel or chromium in the aluminum and aluminium alloy is preferably 100 ppm or less (including 0 ppm). For example, the use of the Al—Cu alloy increases the strength, but decreases corrosion resistance. Therefore, the Al—Cu alloy is not suitable for the current collector 14.

More preferably, the aluminum foil as the current collector 14 facing the negative electrode 13 has a purity of 98.0% to 99.95%. The aluminum foil and the aluminum alloy foil have a thickness of 20 µm or less, preferably 15 µm or less.

Examples of negative electrode active material particles allowing lithium ions to be inserted in and extracted from used as the negative electrode active material include a carbon material, a graphite material, a lithium alloy material, a metal oxide, and a metal sulfide. Among them, it is preferable to select negative electrode active material particles including at least one of titanium-containing oxide selected from lithium titanium oxide, titanium oxide, niobium titanium oxide, and lithium sodium niobium titanium oxide having the lithium ion insertion/extraction potential of within a range of 1 V to 3 V (vs Li/Li$^+$).

Examples of the titanium-containing oxide include lithium titanium oxide such as lithium titanium oxide having a spinel structure, represented by Li$_{4+x}$Ti$_5$O$_{12}$ (−1≤x≤3); orthorhombic titanium oxide represented by Li$_{2+a}$M(I)$_{2-b}$Ti$_{6-c}$M(II)$_d$O$_{14+\sigma}$ (0≤a≤6, 0<b<2, 0<c<6, 0<d<6, −0.5≤δ≤0.5, wherein M(I) is at least one selected from the group consisting of Sr, Ba, Ca, Mg, Na, Cs, and K, and M(II) is at least one selected from the group consisting of Zr, Sn, V, Nb, Ta, Mo, W, Fe, Co, Mn, Al, and Y.); lithium titanium oxide having a ramsdellite structure such as lithium titanium oxide (e.g., Li$_{2+x}$Ti$_3$O$_7$, Li$_{1+x}$Ti$_2$O$_4$, Li$_{1.1+x}$Ti$_{1.8}$O$_4$, Li$_{1.07+x}$Ti$_{1.86}$O$_4$, Li$_x$TiO$_2$ (0≤x); titanium oxide represented by Li$_x$TiO$_2$ (0≤x) having a monoclinic structure (TiO$_2$ (B) as the structure before charging), a rutile structure, or an anatase structure (TiO$_2$ as the structure before charging); and niobium titanium oxide represented by Li$_a$TiM$_b$Nb$_{2\pm\beta}$O$_{7\pm\sigma}$ (0≤a≤5, 0≤b≤0.3, 0≤β≤0.3, 0≤σ≤0.3, wherein M is at least one element selected from the group consisting of Fe, V, Mo, and Ta). These compounds may be used singly or as a mixture thereof. Lithium titanium oxide having a spinel structure represented by Li$_{4+x}$Ti$_5$O$_{12}$ (−1≤x≤3) is more preferred because it causes less volume change. In the case of using these titanium-containing oxides, the same aluminum foil as that used for the positive electrode current collector may be used as the negative electrode current collector in place of an ordinary copper foil, thereby achieving a reduction in weight and cost. Further, it is advantageous for the capacity relative to the weight and size of the secondary battery having a bipolar electrode structure as described below.

It is preferable that the negative electrode active material has an average particle size of 1 μm or less and a specific surface area of 3 to 200 m²/g in accordance with the BET method based on $N_2$ adsorption. The negative electrode active material particles more preferably have an average particle size of 0.1 μm to 0.8 μm.

In addition to the above primary particles, the negative electrode active material may contain secondary particles. The average particle size (diameter) of the secondary particles in the negative electrode active material is preferably larger than 5 μm, and more preferably from 7 μm to 20 μm. When the average particle size is within this range, a negative electrode having a high density is made while the pressing force during manufacturing the negative electrode is kept low, and the stretch of the aluminum foil current collector can be suppressed.

The negative electrode active material particles which contain secondary particles having an average particle size of larger than 5 μm are produced, for example, in the following manner. First, an active material precursor having an average particle size of 1 μm or less made by the synthesis of raw materials of the active materials is subjected to sintering treatment and then grinding treatment using a grinder such as a ball mill or jet mill. Thereafter, the sintering treatment is further performed, whereby the active material precursor is aggregated and grown into secondary particles having a larger particle size. Covering of the secondary particle surface with a carbon material is preferred to reduce the negative electrode resistance. It can be made by adding a carbon material precursor during manufacturing the secondary particles and sintering in an inert atmosphere at 500° C. or more.

The primary and secondary particles of the titanium-containing oxide may coexist in the negative electrode active material layer. In terms of increasing the density of the negative electrode active material layer, the proportion of the primary particles in the negative electrode active material layer is preferably from 5% by volume to 50% by volume.

The porosity of the negative electrode active material layer is preferably within a range of 20% to 50%. Accordingly, it is possible to realize a negative electrode which is excellent in affinity between the negative electrode and the nonaqueous electrolyte and has a high density. The porosity is more preferably with a range of 25% to 40%.

Examples of the conductive agent to be used include a carbon material, an aluminum powder, and TiO. Examples of the carbon material include acetylene black, carbon black, coke, carbon fiber, and graphite. Among them, at least one selected from the group consisting of coke (which is heat-treated at a temperature of 800° C. to 2000° C. and has an average particle size of 10 μm or less), graphite, TiO powder, and carbon fiber having an average diameter of 1 μm or less is preferable. The BET specific surface area of the carbon material based on $N_2$ adsorption is preferably 10 m²/g or more.

The binder functions to bond the active material and the conductive agent to be adhered to the current collector. As the binder, for example, at least one selected from the group consisting of polytetrafluoroethylene (PTFE), polyvinylidene fluoride (PVdF), a cellulose-based material (e.g., sodium carboxymethyl cellulose (CMC)), fluorine-based rubber, styrene butadiene rubber, a core shell binder, an acrylic resin or its copolymer, polyacrylic acid, and polyacrylonitrile may be used, but is not limited thereto.

As proportions of the negative electrode active material, the conductive agent, and the binder, the negative electrode active material is preferably within a range of 80% by weight to 95% by weight, the conductive agent is preferably within a range of 3% by weight to 18% by weight, and the binder is preferably within a range of 2% by weight to 7% by weight.

The negative electrode is made, for example, in the following manner. First, the negative electrode active material, the conductive agent, and the binder are provided. Next, these materials are suspended in an appropriate solvent. This suspension is applied to a current collector such as an aluminum foil, followed by drying and heat-pressing to form a negative electrode.

(Separator)

The separator 12 in FIG. 4 has the same structure as that of the separator 120 as described in the first embodiment. FIG. 5 is an enlarged cross-sectional view showing a portion A in FIG. 4.

In FIG. 5, 110 denotes a positive active material layer, and 130 denotes a negative electrode active material layer. As shown in FIG. 5, recess/protrusion portions formed by a plurality of positive electrode active material particles and a plurality of negative electrode active material particles are present at an interface between the positive active material layer 110 and separator 120 and an interface between the negative electrode active material layer 130 and the separator 120. The separator 120 is formed in such a manner that the interface between the positive active material layer 110 and separator 120 is oriented along the surface of the positive active material layer 110, and the interface between the negative electrode active material layer 130 and the separator 120 is oriented along the surface of the negative electrode active material layer 130. As shown in FIG. 5, for example, the laminate 100 is constructed of the positive active material layer 110 and the separator 120. The laminate 100 may be constructed of the negative electrode active material layer 130 and the separator 120, or may constructed of the positive active material layer 110, the separator 120, and the negative electrode active material layer 130.

In the case where the laminate 100 is constructed of the positive active material layer 110, the separator 120, and the negative electrode active material layer 130, a thickness L of the separator 120 is determined in the following manner. First, the radius $R_{max}$ of the particle having a maximum particle size among the positive electrode active material particles which are in contact with the separator 120 and contained in the positive active material layer 110, is determined. L1 represents a distance from an interface between the positive electrode active material particle having this radius $R_{max}$ and the main surface of the separator 120 to another surface of the separator 120, and the distance L1 is measured. Next, the radius $R_{max}$ of the particle having a maximum particle size among the negative electrode active material particles which are in contact with the separator 120 and contained in the negative electrode active material layer 130 is determined. L2 represents a distance from an interface between the negative electrode active material particle having this radius $R_{max}$ and the main surface of the separator 120 to another surface of the separator 120, and the distance L2 is measured. Then, the smaller one of the distances L1 and L2 is defined as the thickness L of the separator. The radius $R_{max}$ and the thickness L are measured in the same manner as in the first embodiment.

In the case of using the negative electrode active material particles having an average particle size of larger than 5 μm as the secondary particles, the negative electrode active material layer 130 may have large recess/protrusion portions on its surface. In this case, the particles 121 in the separator 120 enter the gap formed by the negative electrode active material particles, thereby reducing the internal resistance.

In the case where the laminate 100 is constructed of the positive active material layer 110, the separator 120, and the negative electrode active material layer 130, when the particles 121 contain the second inorganic compound, the second inorganic compound provides structural strength to the separator 120, thereby ensuring a certain thickness of the separator 120. That is, the positive active material layer 110 is directly adhered to the negative electrode active material layer 130, thereby causing no short circuit.

(Bipolar Electrode Structure)

As another embodiment, the secondary battery according to the embodiment may include the electrode body 210 having a bipolar electrode structure as shown in FIG. 6.

The electrode body 210 has two or more sets of structures, one of which is a structure that the current collector 14, the positive electrode 11, the separator 12, and the negative electrode 13 are stacked in this order. Further, the current collector 14 may be stacked on one side surface of the most end of the negative electrode 13. The number of structures to be stacked may be appropriately changed depending on the design of shape and size of the battery. FIG. 6 shows an example in which five sets of the structures are stacked.

According to the electrode body 210 having a bipolar electrode structure, it is possible to form a thin-type body by tightly bonding the positive electrode 11, the separator 12, and the negative electrode 13 to one another. For that reason, it is possible to realize a compact and high capacity secondary battery being excellent in life performance, thermal stability, and electrochemical stability by stacking a plural number of the structures.

(Container Member)

The electrode body 210 shown in FIGS. 4 to 6 is housed in a container member and used. The container member may be, for example, a laminate film container or a metal container. Examples of the shape of the container member include a flat type (thin-type), a rectangular type, a cylindrical type, a coin type, a button type, a seat type, and a lamination type. The container member may have any size depending on battery dimensions. For example, the container member has a size for a small battery which is mounted to a mobile electronic device or a size for a large battery which is mounted on a two- or four-wheel vehicle.

As the laminate film, a multilayer film which includes a metal layer interposed between resin films is used. The thickness of the laminate film is preferably 0.2 mm or less. The metal layer is preferably an aluminum foil or an aluminum alloy foil in order to reduce the weight. The purity of the aluminum foil is preferably 99.5% or more.

As the material of the resin film, a polymer material such as polypropylene (PP), polyethylene (PE), nylon, or polyethylene terephthalate (PET) may be used. The laminate film may be molded into the shape of the container member by sealing by thermal fusion bonding.

The thickness of the metal container is preferably 0.5 mm or less, and more preferably 0.3 mm or less.

The metal container is formed from aluminum, an aluminium alloy, iron, stainless steel, or the like. The aluminium alloy preferably contains an element such as magnesium, zinc, or silicon. The content of a transition metal such as iron, copper, nickel, and chromium in the aluminum alloy may preferably be 100 ppm or less. With such content, it is possible to dramatically improve a long-term reliability and a heat release performance in a high-temperature environment.

The metal can is preferably formed from an aluminium alloy having a purity of 99.8% or less. The strength of the aluminium alloy can is dramatically increased, thereby decreasing the thickness of the can. As a result, it is possible to realize a thin-type secondary battery which has a light weight, a high power, and an excellent heat release performance.

(Positive Electrode Terminal)

The positive electrode terminal may be formed from a material which exhibits an electrical stability and conductivity when the potential to lithium is, for example, within a range of 3 V to 4.5 V (vs Li/Li$^+$). Specific examples thereof include aluminium and an aluminium alloy containing an element such as Mg, Ti, Zn, Mn, Fe, Cu or Si. It is preferable to use the same material as that used for the current collector in order to reduce contact resistance.

(Negative Electrode Terminal)

The negative electrode terminal may be formed from a material which has an electrical stability and conductivity when the potential to lithium is, for example, within a range of 0.4 V to 3 V (vs Li/Li$^+$). Specific examples thereof include aluminium and an aluminium alloy containing an element such as Mg, Ti, Zn, Mn, Fe, Cu or Si. It is preferable to use the same material as that used for the current collector in order to reduce contact resistance.

Subsequently, an example of the secondary battery according to the present embodiment will be described with reference to the drawings.

FIG. 7 is a cross-sectional pattern diagram schematically showing an example of the secondary battery according to the present embodiment. FIG. 7 shows an example of a secondary battery 21 in which an electrode body 210 has a bipolar electrode structure. In FIG. 7, the electrode body 210 has two or more sets of structures, one of which is a structure that the current collector 14, the positive electrode 11, the separator 12, and the negative electrode 13 are stacked in this order. Further, the current collector 14 is stacked on one side surface of the most end of the positive electrode 11, shown on the top of FIG. 7. Furthermore, the current collector 14 is stacked one side surface of the most end of the negative electrode 13, shown on the bottom of FIG. 7. The electrode body 210 is housed in a container member 15 made of a laminate film which includes a metal layer sandwiched between two resin films. A positive electrode terminal 17 is electrically connected to the current collector 14 which is adjacent to the positive electrode 11 located at the edge of the electrode body 210. A negative electrode terminal 16 is electrically connected to the current collector 14 which is adjacent to the negative electrode 13 located at the edge of the electrode body 210. Although not shown in FIG. 7, the positive electrode terminal 17 and the negative electrode terminal 16 are drawn to the outside from the container member 15.

The secondary battery according to the second embodiment includes the laminate according to the first embodiment. Accordingly, it is possible to realize a secondary battery with a high capacity and an excellent discharge performance at low temperatures.

(Third Embodiment)

According to a third embodiment, a battery pack is provided. The battery pack includes the secondary battery according to the second embodiment.

The battery pack according to the present embodiment may include a secondary battery or a plural of secondary batteries. The secondary batteries included in the battery pack may be electrically connected in series, in parallel, or in a combination of in series and in parallel. The secondary batteries may be electrically connected to form a battery module. The battery pack may include a plural of battery modules.

The battery pack further includes a protective circuit. The protective circuit controls the charge and discharge of the secondary battery. Further, a circuit included in a device using as the battery pack as a power source (e.g., an electronic device or an automobile) may be used as the protective circuit of the battery pack.

Further, the battery pack may further include an external power distribution terminal. The external power distribution terminal outputs a current from the secondary battery to outside and inputs a current into the secondary battery. In other words, when the battery pack is used as a power source, the current is supplied to the outside through the external power distribution terminal. When charging the battery pack, charging current (including regenerative energy of automobile power) is supplied to the battery pack through the external power distribution terminal.

Subsequently, an example of the battery pack according to the present embodiment will be described with reference to the drawings.

FIG. 8 is an exploded perspective view showing an example of the battery pack according to the present embodiment. FIG. 9 is a block diagram showing an electric circuit of the battery pack of FIG. 8.

A battery pack 20 shown in FIG. 7 includes a plural of the secondary batteries 21 which have been described with reference to FIGS. 4 to 7.

Each of the secondary batteries 21 is stacked in such a manner that a negative electrode terminal 16 and a positive electrode terminal 17 extending out are oriented in the same direction, and bound by an adhesive tape 22 to form a battery module 23. As shown in FIG. 9, the secondary batteries 21 are connected electrically in series with each other.

A printed wiring board 24 is disposed opposing the side surface of the secondary batteries 21 from which the negative electrode terminal 16 and the positive electrode terminal 17 are extended. As shown in FIG. 9, a thermistor 25, a protective circuit 26, and an energizing terminal 27 to an external device are mounted on the printed wiring board 24. An insulating plate (not shown) is attached to the surface of the printed wiring board 24 which faces the battery module 23, thereby avoiding unnecessary connection with the wiring line of the battery module 23.

A positive electrode lead 28 is connected to the positive electrode terminal 17 of the secondary battery 21 which is located at the undermost layer of the battery module 23, and its tip is inserted to and electrically connected to a positive electrode connector 29 of the printed wiring board 24. A negative electrode lead 30 is connected to the negative electrode terminal 16 of the secondary battery 21 which is located at the uppermost layer of the battery module 23, and its tip is inserted to and electrically connected to a negative electrode connector 31 of the printed wiring board 24. These connectors 29 and 31 are connected to a protective circuit 26 via wiring lines 32 and 33 that are formed on the printed wiring board 24.

The thermistor 25 detects the temperature of each of the secondary batteries 21. The detection signal is sent to the protective circuit 26. The protective circuit 26 can shut down a plus wiring line 34a and a minus wiring line 34b between the protective circuit 26 and the energizing terminal 27 to an external device under a predetermined condition. The predetermined condition refers to, for example, the time at which the temperature of each of the secondary batteries 21 detected by the thermistor 25 reaches a predetermined temperature or more. Further, the predetermined condition refers to the time at which over-charge, over-discharge, and over-current of the secondary batteries 21 are detected. The over-charge detection is performed on each of the secondary batteries 21 or the battery module 23. When each of secondary batteries 21 is detected, the battery voltage may be detected, or the positive electrode potential or the negative electrode potential may be detected. In the case of the latter, a lithium electrode to be used as a reference electrode is inserted into each of the secondary batteries 21. In the case of FIGS. 8 and 9, a wiring line 35 for voltage detection are connected to the secondary batteries 21 and detection signals are sent to the protective circuit 26 through the wiring line 35.

Protective sheets 36 made of rubber or resin are disposed respectively on three side surfaces among four side surfaces of the battery module 23 except for the side surface from which the positive electrode terminal 17 and negative electrode terminal 16 protrude.

The battery module 23 is housed in a housing container 37 together with each of the protective sheets 36 and the printed wiring board 24. The protective sheets 36 are disposed on both inner surfaces in a long side direction and one of the inner surfaces in a short side direction of the housing container 37. The printed wiring board 24 is disposed on the other inner surface at the opposite side of the inner surface in a short side direction of the housing container 37 in which the protective sheets 36 are disposed. The battery module 23 is located in a space surrounded by the protective sheets 36 and the printed wiring board 24. A lid 38 is attached to the top of the housing container 37.

In order to fix the battery module 23, a heat-shrinkable tape may be used in place of the adhesive tape 22. In this case, the battery module 23 is bound by placing the protective sheets on both side surfaces of the battery module 23, revolving the heat-shrinkable tape, and thermal shrinking the heat-shrinkable tape.

Although the battery pack 20 in FIG. 8 includes the secondary batteries 21, the battery pack 20 may include a secondary battery 21.

The embodiment of the battery pack is appropriately changed according to the use. The battery pack according to the embodiment is used suitably for the application which requires excellent cycle life characteristics at a high current. It is specifically used as a power source for digital cameras, for vehicles such as two- or four-wheeled hybrid electric vehicle, for two- or four-wheeled electric vehicles, or for assisted bicycles. Particularly, it is suitably used as a battery for automobile use.

In a vehicle, such as an automobile to which the battery pack according to the present embodiment is mounted, the battery pack is configured to recover regenerative energy caused by power of the vehicle. Examples of the vehicle include a two- or four-wheeled hybrid electric vehicle, a two- or four-wheeled electric vehicle, an assisted bicycle, and a train.

The battery pack according to the third embodiment includes the secondary battery according to the second embodiment. Accordingly, it is possible to realize a battery pack which includes a secondary battery with a high capacity and an excellent discharge performance at low temperatures.

(Fourth Embodiment)

According to a fourth embodiment, a vehicle is provided. The vehicle includes the battery pack according to the third embodiment.

FIG. 16 shows an example of an automobile as a vehicle which includes a battery pack according to the third embodiment.

The automobile 41 shown in FIG. 16 includes a battery pack 42 which is an example of the battery pack according to the third embodiment mounted in its engine room. The mounting position is not limited to engine rooms. For example, the battery pack may also be mounted in rear parts of automobiles or under seats.

The vehicle according to the fourth embodiment includes the battery pack according to the third embodiment. Accordingly, it is possible to obtain a vehicle which includes a secondary battery having a high capacity and an excellent discharge performance at low temperatures.

EXAMPLES

Hereinafter, Examples will be described; however, the present invention is not limited to the following examples.

Example 1

As described below, a monolayer electrode body comprising a positive electrode, a separator, and a negative electrode was made.

<Production of Positive Electrode>

As the positive electrode active material, $LiMn_{0.85}Fe_{0.1}Mg_{0.05}PO_4$ having an olivine structure which included primary particles having an average particle size of 50 nm and in which carbon fine particles having an average particle size of 5 nm were attached to the surface was provided. The deposited amount of carbon fine particles was 0.1% by weight relative to the total amount of the positive electrode active material. As the conductive agent, a vapor-phase grown carbon fiber with a diameter of 0.1 μm and a graphite powder were provided. As the binder, PVdF was provided.

By weight, 87% of positive electrode active material, 3% by weight of carbon fiber, 5% by weight of graphite powder, and 5% by weight of PVdF relative to the total weight of the positive electrode were dispersed in an n-methyl-pyrrolidone (NMP) solvent to prepare a slurry. The slurry was applied to one side of a 15-μm-thick aluminum alloy foil (purity: 99%), dried, and the aluminum alloy foil was pressed to form a positive electrode having a positive active material layer with a thickness of 67 μm at one side and an electrode density of 2.2 g/cm$^3$.

<Production of Negative Electrode>

As the negative electrode active material, $Li_4Ti_5O_{12}$ particles having an average particle size of 0.6 μm and a specific surface area of 10 m$^2$/g were provided. As the conductive agent, a graphite powder having an average particle size of 6 μm was provided. As the binder, PVdF was provided.

By weight, 95% of negative electrode active material, 3% by weight of graphite powder, and 2% by weight of PVdF relative to the total weight of the negative electrode were dispersed in an n-methyl-pyrrolidone (NMP) solvent, and the resulting dispersion was stirred using a ball mill at 1000 rpm for 2 hours to prepare a slurry. The slurry was applied to one side of a 15-μm-thick aluminum alloy foil (purity: 99.3), dried, and the aluminum alloy foil was pressed to form a negative electrode having a negative active material layer with a thickness of 59 μm at one side and an electrode density of 2.2 g/cm$^3$. Further, the porosity of the negative electrode except the current collector was 35%.

<Production of Integral Separator (Laminate)>

$Li_7La_3Zr_2O_{12}$ particles having a primary particle size (diameter) of 0.1 μm were dispersed in an n-methyl-pyrrolidone (NMP) solution containing the PVdF binder to prepare a dispersion. Here, $Li_7La_3Zr_2O_{12}$ particles have ion conductivity of 0.49 mS/cm. The weight ratio of the $Li_7La_3Zr_2O_{12}$ particles and the PVdF binder was 98:2. The dispersion was applied to the positive active material layer using a gravure coater, followed by drying to form an integral separator having a thickness of 3 μm. Coating was performed under the conditions of a line speed of 2 m/min and a gravure roll rotational speed/line speed of 1.5. Drying was carried out at a temperature of 120° C. The $Li_7La_3Zr_2O_{12}$ particles in the integral separator had an average particle size of about 0.5 μm.

An integral separator was formed on the positive active material layer and then the negative electrode produced above was stacked on the integral separator.

In order to determine the radius $R_{max}$ of the active material particle having a maximum particle size as well as the thickness L of the separator, an electrode body was made, the electrode body was cut using FIB, and the formed cross section was observed by SEM. FIGS. 10, 12, and 13 are SEM micrographs showing the cross section of the electrode body of Example 1. FIGS. 14 and 15 are SEM micrographs showing the laminate of Example 1, i.e., the cross section of the laminate in which the integral separator is formed on the positive electrode. These micrographs reveal that the particles included in the separator entered the gap formed by accumulation of the active material particles. Further, the radius $R_{max}$ and the thickness L of the separator were measured and the results were shown in Table 1.

Example 2

A secondary battery was made in the same manner as in Example 1 except that the separator was formed on the negative electrode active material layer.

Example 3

A secondary battery was made in the same manner as in Example 1 except that the separator was formed on the positive active material layer and the separator was formed on the negative electrode active material layer, and then the positive electrode and the negative electrode were stacked so that the separators faced each other.

Example 4

A dispersion containing the same $Li_7La_3Zr_2O_{12}$ particles as those made in Example 1 was applied to a Teflon (registered trademark) seat using an applicator roll. Then, the sheet was dried and pressed to form a sheet-type separator having a thickness of 3 μm. A secondary battery was made in the same manner as in Example 1 except that the sheet-type separator was sandwiched between the positive electrode and the negative electrode.

Example 5

In order to examine the battery performance of a bipolar type battery, an electrode was produced by forming the positive electrode produced in the same manner as in Example 1 on one side of an aluminum collector and forming the negative electrode produced in the same manner as in Example 1 on the other side of the aluminum collector. The integral separators were formed on the surfaces of the positive and negative electrodes in the same manner as in Example 1. The thickness of each of the integral separators formed on the surfaces of the positive and negative electrodes was 2 μm.

On the other hand, a mixture before gelation, namely, a mixture of a mixed solvent of propylene carbonate (PC) and diethyl carbonate (a volume ratio of 1:2) containing 1 M of $LiPF_6$ and a polyacrylonitrile polymer solution (2% by weight) was infiltrated into the gap between the integral separator on the surface of the positive electrode and the integral separator on the surface of the negative electrode. After that, the gelator was gelatinized by heating to form a bipolar type secondary battery. The weight of the organic electrolyte was about 4% by weight, relative to the total weight of the complete separator.

Examples 6 to 13

Secondary batteries of Examples 6 to 13 were made in the same manner as in Example 1 except that the thickness of the integral separator was changed as shown in Table 1.

Example 14

A secondary battery was made in the same manner as in Example 1 except that NASICON-type $Li_{1.3}A_{0.3}Ti_{1.7}(PO_4)$ particles having a primary particle size (diameter) of 0.1 μm were used as particles used for the integral separator. The $Li_{1.3}Al_{0.3}Ti_{1.7}(PO_4)$ particles have lithium ion conductivity of $7 \times 10^{-4}$ S/cm.

Comparative Example 1

A secondary battery was made in the same manner as in Example 1 except that a 20 μm-thick polyethylene (PE) porous film was used as the separator instead of forming the integral separator.

Comparative Example 2

A secondary battery was made in the same manner as in Example 1 except that a 15 μm-thick polypropylene (PP) porous film was used as the separator instead of forming the integral separator.

Comparative Example 3

A secondary battery was made in the same manner as in Example 1 except that $Al_2O_3$ particles having a primary particle size (diameter) of 0.1 μm were used as particles used for the integral separator.

<Evaluation of Ratio $L/R_{max}$>

As for each of the secondary batteries made above, the electrode body was cut along the diagonal line using FIB, whereby the positive electrode, the separator, and the negative electrode were cut. Then, the whole cross section was observed using SEM. Based on the observation, the radius $R_{max}$ of the active material particle having a maximum particle size, among the active material particles in contact with the separator was measured. Further, based on the observation, the thickness L of the separator was measured. Then, the ratio $L/R_{max}$ was calculated from the thickness L and the radius $R_{max}$. These results are shown in Table 1 below.

<Measurement of Volume Energy Density>

The volume energy density of each of the produced secondary batteries was measured. The volume energy density was determined by dividing the product of the average operating voltage and the battery capacity by the battery volume. At that time, the discharge capacity at 1 C was used as the battery capacity. The length, width, and thickness of each of the batteries were measured and the battery volume was calculated.

<Discharge Capacity Retention Ratio at 25° C.>

As for each of the produced secondary batteries, the discharge capacity retention ratio at 25° C. was measured. First, each of the batteries was fully charged with a current of 0.2 C at room temperature (25° C.), left for 10 minutes, and fully discharged with a current of 1 C. Then, the discharge capacity was measured. Next, each of the batteries was fully charged again with a current of 0.2 C at room temperature (25° C.), left for 10 minutes, and fully discharged with a current of 10 C. Then, the discharge capacity was measured. The ratio of the 10 C discharge capacity to the measured 1 C discharge capacity was defined as the discharge capacity retention ratio at 25° C.

<Discharge Capacity Retention Ratio at Low Temperatures>

As for each of the produced secondary batteries, the discharge capacity retention ratio at 25° C. was measured. First, each of the batteries was fully charged with a current of 0.2 C at room temperature (25° C.), left for 10 minutes, and fully discharged with a current of 1 C. Then, the discharge capacity was measured. Next, each of the batteries was fully charged again with a current of 0.2 C at room temperature (25° C.), left for 10 minutes, transferred to an environment of −30° C., and fully discharged with a current of 1 C. Then, the discharge capacity was measured. The discharge capacity retention ratio at −30° C. relative to the measured discharge capacity at 25° C. was measured.

These results are compiled in Table 1 below.

In Table 1, the "separator forming portion" indicates a portion in which the positive electrode and/or the negative electrode are formed and then the integral separator is formed. In this regard, the "seat" described in Example 4 indicates the case where a single separator is formed in place of the integral separator and then the separator sheet is sandwiched between the positive electrode and the negative electrode. Further, the "film" described in Comparative Examples 1 and 2 also indicates the case where a single film is sandwiched between the positive electrode and the negative electrode.

TABLE 1

| | Separator forming portion | L (μm) | $R_{max}$ (μm) | $L/R_{max}$ | Volume energy density (Wh/L) | Discharge capacity retention ratio at 25° C. (%) | Discharge capacity retention ratio at low temperatures (%) |
|---|---|---|---|---|---|---|---|
| Example 1 | Positive electrode | 3 | 1 | 3 | 195 | 85 | 69 |
| Example 2 | Negative electrode | 3 | 1 | 3 | 195 | 85 | 68 |
| Example 3 | Positive electrode, Negative electrode | 6 | 3 | 2 | 190 | 82 | 65 |

TABLE 1-continued

| | Separator forming portion | L (μm) | $R_{max}$ (μm) | $L/R_{max}$ | Volume energy density (Wh/L) | Discharge capacity retention ratio at 25° C. (%) | Discharge capacity retention ratio at low temperatures (%) |
|---|---|---|---|---|---|---|---|
| Example 4 | Seat | 3 | 2 | 1.5 | 195 | 84 | 65 |
| Example 5 | Positive electrode, Negative electrode | 7 | 3 | 2.3 | 180 | 82 | 62 |
| Example 6 | Positive electrode | 2 | 0.4 | 5 | 200 | 84 | 69 |
| Example 7 | Positive electrode | 1 | 1 | 1 | 204 | 85 | 70 |
| Example 8 | Positive electrode | 0.8 | 0.5 | 1.6 | 206 | 88 | 69 |
| Example 9 | Positive electrode | 0.5 | 2 | 0.25 | 207 | 87 | 69 |
| Example 10 | Positive electrode | 0.1 | 4 | 0.025 | 210 | 86 | 70 |
| Example 11 | Positive electrode | 0.05 | 0.1 | 0.5 | 210 | 87 | 71 |
| Example 12 | Positive electrode | 0.02 | 3 | 0.0067 | 210 | 85 | 71 |
| Example 13 | Positive electrode | 0.01 | 4 | 0.0025 | 210 | 87 | 72 |
| Example 14 | Positive electrode | 3 | 1 | 3 | 195 | 81 | 60 |
| Comparative example 1 | Film | 20 | 2 | 10 | 140 | 79 | 51 |
| Comparative example 2 | Film | 15 | 2 | 7.5 | 150 | 80 | 54 |
| Comparative example 3 | Positive electrode | 3 | 1 | 3 | 195 | 76 | 57 |

Table 1 indicates the following.

As the ratio $L/R_{max}$ is decreased, the volume energy density is improved. As for the discharge performance at 25° C. and the discharge performance at low temperatures, particularly the discharge performance at low temperatures is improved as the ratio $L/R_{max}$ is decreased. The volume energy densities of Examples 1 to 14 are equal to or superior to those of Comparative Examples 1 to 3. The discharge performances, particularly the discharge performances at low temperatures of Examples 1 to 14 are significantly superior to those of Comparative Examples 1 to 3. The volume energy densities of Examples 1 and 14 and Comparative example 3, in which only the particles used for the separator were changed, were equal to one another. But, the discharge performances at 25° C. and the discharge performances at low temperatures of Examples 1 and 14 were superior to those in Comparative Example 3.

The laminate of at least one of the embodiments and the examples includes an active material layer that contains the active material particles, and a separator that is layered on the active material layer. The separator includes particles comprising an inorganic compound having lithium ion conductivity at 25° C. of $1\times10^{-10}$ S/cm or more. A ratio ($L/R_{max}$) of a thickness L to a radius $R_{max}$ satisfies $0<L/R_{max}\leq5$, where the radius $R_{max}$ is a radius of the active material particle having a maximum particle size among the active material particles facing the separator and the thickness L is a thickness of the separator that is in contact with the active material particle having a maximum particle size. Therefore, the use of the laminate according to the first embodiment realizes a secondary battery with a high capacity and an excellent discharge performance at low temperatures.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A laminate comprising:
    an active material layer that comprises a plural of active material particles;
    a separator that is layered on the active material layer, and comprises a first surface and a second surface opposed to the first surface; and
    an organic electrolyte,
    wherein the separator comprises particles comprising an inorganic compound having lithium ion conductivity at 25° C. of $1\times10^{-10}$ S/cm or more, and a ratio ($L/R_{max}$) of a thickness L to a radius $R_{max}$ satisfies $0<L/R_{max}\leq5$,
    where the radius $R_{max}$ is a radius of the active material particle having a maximum particle size among the active material particles facing the first surface of the separator, and the thickness L is distance from an interface between the active material particle having a maximum particle size and the first surface of the separator to the second surface of the separator,
    and wherein a ratio of an amount of the organic electrolyte to a total amount of the particles and the organic electrolyte is within a range of 1% by mass to 10% by mass.

2. The laminate according to claim 1, wherein the inorganic compound has a garnet structure.

3. The laminate according to claim 1, wherein an average particle size of the particles is smaller than an average particle size of the active material particles.

4. The laminate according to claim 1, wherein the ratio ($L/R_{max}$) is 2 or less.

5. The laminate according to claim 1, wherein the ratio ($L/R_{max}$) is 1 or less.

6. The laminate according to claim 1, wherein the ratio ($L/R_{max}$) is 0.8 or less.

7. The laminate according to claim 1, wherein the ratio ($L/R_{max}$) is within a range of 0.001 to 0.33.

8. The laminate according to claim 1, wherein the average particle size of the particles is 1 μm or less.

9. The laminate according to claim 1, wherein the organic electrolyte comprises at least one selected from the group consisting of propylene carbonate, ethylene carbonate, diethyl carbonate, and methylethyl carbonate.

10. A secondary battery comprising the laminate according to claim 1.

11. A battery pack comprising the secondary battery according to claim 10.

12. The battery pack according to claim 11, further comprising:
an external power distribution terminal; and
a protective circuit.

13. The battery pack according to claim 11, comprising a plural of the secondary batteries, wherein the secondary batteries are electrically connected in series, in parallel, or in a combination of in series and in parallel.

14. A vehicle comprising the battery pack according to claim 11.

15. The vehicle according to claim 14, wherein the battery pack is configured to recover regenerative energy caused by power of the vehicle.

* * * * *